United States Patent [19]

Harmuth et al.

[11] Patent Number: 5,569,631
[45] Date of Patent: Oct. 29, 1996

[54] REFRACTORY CERAMIC MASS AND ITS USE

[75] Inventors: Harald Harmuth, Villach; Roland Heindl; Josef Deutsch, both of Leoben, all of Austria

[73] Assignee: Veitsch-Radex Aktiengesellschaft Fur Feuerfeste Erzeugnisse, Wien, Austria

[21] Appl. No.: 385,050

[22] Filed: Feb. 7, 1995

[30] Foreign Application Priority Data

Feb. 8, 1994 [DE] Germany .......................... 44 03 869.0

[51] Int. Cl.6 .................................................. C04B 35/04
[52] U.S. Cl. .......................... 501/112; 501/120; 501/123; 501/125; 501/127
[58] Field of Search .................................. 501/110, 112, 501/120, 153, 108, 123, 125, 127

[56] References Cited

U.S. PATENT DOCUMENTS

| | | | |
|---|---|---|---|
| 3,785,842 | 1/1974 | Murray | 501/112 |
| 4,389,492 | 6/1983 | Tanemura | 501/120 |
| 4,729,974 | 3/1988 | Nazirizadeh et al. | 501/121 |
| 4,775,648 | 10/1988 | Bartha et al. | 501/112 |
| 4,954,463 | 9/1990 | Knauss | 501/120 |

FOREIGN PATENT DOCUMENTS 2479184 10/1981 France .................................. 501/120

OTHER PUBLICATIONS

Japanese Patent Abstract—"Slakable Refractory Raw Material", Nishio et al. JP 05–43279 (Jun. 29, 1993).

Japanese Patent Abstract—"Jig for Calcining Electronic Parts" JP 02–69381 (May 29, 1990) Ito.

*Primary Examiner*—Paul Marcantoni
*Attorney, Agent, or Firm*—John F. A. Earley; John F. A. Earley, III

[57] ABSTRACT

The present invention pertains to a refractory ceramic mass, consisting of 50 to 97 wt. % of sintered MgO as well as 3 to 50 wt. % of a spinel of the hercynite type.

14 Claims, No Drawings

REFRACTORY CERAMIC MASS AND ITS USE

The present invention pertains to a refractory ceramic mass as well as to its use.

The present invention pertains especially to a basic refractory ceramic mass based on a sintered MgO (sintered magnesia). Sintered MgO is an essential component of all MgO and MgO spinel products. The sintered MgO is mineralogically called periclase. The essential raw material basis for preparing sintered MgO is magnesite, i.e., magnesium carbonate, or a synthetic source of magnesia.

Refractory ceramic masses based on sintered MgO have been known in combination with various additives to control certain material properties, especially to improve the chemical resistance to slags, to improve the ductility, as well as the resistance to thermal shocks. These [additives] include, e.g., chrome ore for preparing so-called magnesia chromite bricks. Their advantage is a reduced brittleness or higher ductility compared with pure magnesia bricks. In addition, there is improved corrosion resistance to nonbasic slags.

Even though such products have proved to be successful, in principle, optimizing refractory ceramic masses and moldings prepared from them has been a constant goal. For example, products with the lowest possible brittleness are demanded for lining industrial furnaces in which the refractory lining can be expected to be subject to appreciable mechanical stresses. These include, e.g., rotary kilns in the cement industry, where the refractory lining may be subject to a considerable mechanical stress due to a deformation of the furnace, but also furnaces of the steel-making and nonferrous metal industry, where problems are caused especially by thermal stresses during heating and changes in temperature.

A relatively high percentage of alkalis as well as reducing conditions, especially because of the fuel used in an industrial furnace, lead to difficulties if chrome ore-containing products are used. The alkali chromate and alkali chromosulfate formation, as well as the appearance of hexavalent chromium represent above all an environmental problem.

For this reason, $Al_2O_3$-containing products were developed, which are prepared by adding alumina or magnesium aluminum spinel ($MgAl_2O_4$) to the brick mixture (MgO matrix). Some of these chromium oxide-free grades have very good mechanical properties, but they frequently require high-quality and expensive raw materials.

Two typical batch compositions of a refractory basic mass for preparing bricks are described below:

|  | A | B |
| --- | --- | --- |
| Sintered magnesia | 75 wt. % | 93 wt. % |
| Chrome ore | 25 wt. % |  |
| Sintered alumina |  | 7 wt. % |

The basic task of the present invention is to provide a refractory ceramic mass, which leads to good mechanical properties of the fired product after processing into fired moldings. The ductility shall be improved, in particular, in order for the products to be able to be used advantageously for applications associated with the development of mechanical and/or thermal stresses.

The ductility (having m as the unit of measurement) is designated by R"", and it is subject to the following law:

$$R'''' = \frac{G_f}{\sigma_f^2} \cdot E \, [m]$$

The following proportionality applies as well:

$$R'''' \sim \frac{G_f}{G_0}$$

in which $G_f$ is the energy of fracture ($J/m^2$), $G_0$ is the energy of fracture for crack initiation ($J/m^2$), $\sigma_f$ is the stress at break ($N/m^2$), and E is the modulus of elasticity ($N/m^2$).

It was surprisingly found that this goal can be accomplished by the combination of a sintered MgO with a spinel of the hercynite type (Mg, Fe)(Fe, Al)$_2$O$_4$.

Consequently, the present invention pertains, in its most general embodiment, to a refractory ceramic mass comprising:

a) 50 to 97 wt. % of sintered MgO and
b) 3 to 50 wt. % of a spinel of the hercynite type.

The sintered MgO may be completely or partially replaced with fused magnesia.

According to one embodiment, the percentages of sintered MgO are specified at 75 to 95 wt % and those of the spinel at 5 to 25 wt. %.

The composition of the hercynite-like spinel shall be within the following ranges:

a) 23 to 55 wt. % of iron, calculated as FeO,
b) <15 wt. % of MgO,
c) <3 wt. % of impurities, especially $SiO_2$, CaO, $Cr_2O_3$, MnO, alkalis.

Part of the iron usually occurs as trivalent iron and may be thus bound by $Mg^{2+}$ as a divalent cation. Thus, an example of the composition of the spinel is:

a) 45 to 50 wt. % of total iron, calculated as FeO,
b) 1 to 5 wt. % of MgO,
c) 45 to 50 wt. % of $Al_2O_3$, and
d) <3 wt. % of impurities, as above.

According to other embodiments of the present invention, the spinel is used as a fused spinel; however, it is also possible to use a sintered spinel.

While the sintered MgO shall be used in a granule fraction of <8 mm and preferably <4 mm, it was found to be meaningful to use the spinel in a finer fraction compared with the sintered MgO; the upper limit of the granule size should be 3 mm and preferably 2 mm.

A partial fraction of the sintered MgO may be used as a fine fraction of <125 μm, and this percentage, relative to the total mass, may amount to 10 to 35 wt. % and, according to one embodiment, to 15 to 30 wt. %.

The specific reaction and sintering mechanisms have not yet been completely clarified. Based on the findings obtained to date, the improved mechanical properties required and achieved can be explained by no complete, dense sintering taking place between the individual components of the mass, so that the fired, refractory molding prepared from the mass preserves a certain "elasticity" (flexibility). Cracks are formed, at best, under mechanical load due to differences in the moduli of elasticity of the sintered material and the spinel.

The fired refractory bricks prepared by using the new mass exhibit markedly improved ductility, for which we refer to the exemplary embodiment below as well as to the reference values for bricks from the batch compositions A and B.

The mass according to the present invention consisted of 59 wt. % of sintered magnesia of the granule size of >125 μm and <4 mm as well as of 28 wt % of sintered magnesia of the granule size fraction of <125 μm. This matrix was mixed with 13 wt. % of a hercynite-like spinel containing approx. 47 wt. % of total iron, calculated as FeO, 3 wt. % of MgO, and 48 wt. % of $Al_2O_3$, the rest being impurities. The mass was subsequently processed in the usual manner, pressed into bricks, and fired.

The chemical analysis is (in wt. %):

| | |
|---|---|
| $SiO_2$ | 0.53 |
| $Fe_2O_3$ | 11.55 |
| $Al_2O_3$ | 6.26 |
| CaO | 1.77 |
| MgO | 79.25. |
| Rest: impurities. | |

The brick (C) according to the present invention was compared with analogous bricks from the batch compositions A and B by determining the R"" values, These are related to the maximum R"" value below, and they were measured at room temperature:

| | A | B | C |
|---|---|---|---|
| $\frac{R''''}{R''''_{max}} \cdot 100\%$ | 72 | 55 | 100 |

It follows from this that the brick prepared from the refractory mass according to the present invention has a markedly improved ductility compared with the state of the art.

We claim:

1. Refractory ceramic mass, comprising a mixture of:
   a) 50 to 97 wt. % of sintered MgO and
   b) 3 to 50 wt. % of a fused spinal of hercynite (Mg,Fe) $(Fe,Al)_2O_4$.

2. Mass in accordance with claim 1, comprising a mixture of:
   a) 75 to 95 wt. % of sintered MgO and
   b) 5 to 25 wt. % of a fused spinal of hercynite (Mg,Fe) $(Fe,Al)_2O_4$.

3. Mass in accordance with claim 1, in which the spinel comprises a mixture of:
   a) 23 to 55 wt. % of iron, calculated as FeO,
   b) <15 wt. % of MgO,
   c) 45 to 65 wt. % of $Al_2O_3$, and
   d) <3 wt. % of impurities selected from the group consisting of $SiO_2$, CaO, $Cr_2O_3$MnO, alkalies, and combinations thereof.

4. Mass in accordance with claim 3, in which the spinel comprises a mixture of:
   a) 45 to 50 wt. % of iron, calculated as FeO,
   b) 1 to 5 wt. % of MgO,
   c) 45 to 50 wt. % of $Al_2O_3$, and
   d) <3 wt. % of impurities selected from the group consisting of $SiO_2$, CaO, $Cr_2O_3$, MnO, alkalies, and combinations thereof.

5. Mass is accordance with claim 1, in which the spinel is a fused spinel.

6. Mass in accordance with claim 1, in which the sintered MgO occurs in a particle size of <8 mm and the spinel occurs in a particle size of <3 mm.

7. Mass in accordance with claim 6, in which the sintered MgO occurs in a particle size of <4 mm and the spinel occurs in a particle size of <2 mm.

8. Mass in accordance with claim 1, in which 10 to 35 wt. % consist of a sintered MgO in a particle size of <125 μm.

9. Mass in accordance with claim 1, in which the sintered MgO is completely or partially replaced with fused magnesia.

10. Composition in accordance with claim 1 wherein said ceramic mass is used for preparing fired refractory moldings.

11. Refractory ceramic mass, comprising a mixture of:

75 to 95 wt. % of sintered MgO, and 5 to 25 wt. % of a spinel of the hercynite (Mg,Fe) $(Fe,Al)_2O_4$, in which the spinel comprises 45 to 50 wt. % of iron, calculated as FeO, 1 to 5 wt. % of MgO, 45 to 50 wt. % of $Al_2O_3$, and <3 wt. % of impurities selected from the group consisting of $SiO_2$, CaO, $Cr_2O_3$, MnO, alkalies, and combinations thereof, in which the spinel is a fused spinel, in which the sintered MgO occurs in a particle size of <4 mm and the spinel occurs in a particular size granule fraction of <2mm, in which 10 to 35 wt. % consist of a sintered MgO in a particle size of <125 μm.

12. Mass in accordance with claim 11, in which the sintered MgO is completely or partially replaced with fused magnesia.

13. Composition in accordance with claim 11 wherein the ceramic mass is used for preparing fired refractory moldings.

14. Composition in accordance with claim 12 wherein the ceramic mass is used for preparing fired refractory moldings.

\* \* \* \* \*